United States Patent [19]
Mikami et al.

[11] Patent Number: 4,738,499
[45] Date of Patent: Apr. 19, 1988

[54] STATIONARY HOLOGRAM SCANNER

[75] Inventors: Izumi Mikami, Amagasaki; Kazurou Nishi, Amagasaki; Takashi Harada, Amagasaki; Hidekazu Edo, Amagasaki; Yasuchika Hatanaka, Kobe, all of Japan

[73] Assignee: Mitsubishi Denki Kabushiki Kaisha, Tokyo, Japan

[21] Appl. No.: 845,326

[22] Filed: Mar. 28, 1986

[30] Foreign Application Priority Data

Jun. 12, 1985 [JP] Japan .................................. 60-127759
Jun. 12, 1985 [JP] Japan .................................. 60-127760
Feb. 3, 1986 [JP] Japan .................................. 61-21558

[51] Int. Cl.$^4$ ............................................. G02B 26/10
[52] U.S. Cl. ...................................... 350/3.71; 350/6.3; 350/6.5; 350/6.7
[58] Field of Search ......................... 350/3.71, 3.7, 6.1, 350/6.3, 6.5, 6.7, 6.2

[56] References Cited
U.S. PATENT DOCUMENTS
4,647,143 3/1987 Yamazaki et al. .................. 350/3.71

FOREIGN PATENT DOCUMENTS
58-1119(A) 1/1983 Japan .................................. 350/3.71
58-111916(A) 7/1983 Japan .................................. 350/3.71

OTHER PUBLICATIONS
Printed Publication, "Holography in the IBM 3687 Supermarket Scanner", IBM J. Res. Develop., vol. 26, No. 2, pp. 228–234, Mar. 1982—(Dickson et al.).

Primary Examiner—Bruce Y. Arnold
Assistant Examiner—Martin Lerner
Attorney, Agent, or Firm—Burns, Doane, Swecker and Mathis

[57] ABSTRACT

A stationary hologram scanner according to the present invention divides one light beam into a plurality of parts (switched-over in a time division manner) prior to the incidence of the light beam on the hologram disk, so that a construction, in which only one mirror is installed between the hologram disk and a reading window, is possible, thereby reducing a cross-sectional area of one side portion of an apparatus in comparison with the conventional apparatus; as a result, an operator can reasonably operate the scanner in a seated posture with the operator's knees below this portion.

19 Claims, 9 Drawing Sheets

STATIONARY HOLOGRAM SCANNER

BACKGROUND OF THE INVENTION

1. Field of the Invention

The present invention relates to a stationary hologram scanner installed at a register in a market and the like for reading bar codes printed on goods.

2. Description of the Prior Art

In recent years, bar codes printed on goods are read to carry out the counting and the inventory control in not only large scale supermarkets but also general stores. And, a hologram scanner is used as one kind of apparatus for reading bar codes.

The conventional stationary hologram scanner is described below with reference to FIG. 13 which is a schematic drawing showing the construction thereof.

Referring now to FIG. 13, reference numeral 1 designates a laser oscillator, 2 designating a light beam irradiated from the laser oscillator 1, 3 designating a lens, 4 designating a mirror, 5 designating a perforated mirror provided with an opening for passing the light beam 2 therethrough, 6, 6 . . . designating hologram lenses for deflecting the light beam 2, 7 designating a hologram disk provided with said hologram lenses having equal numbers of scanning lines whose centers are moved by a quantity corresponding to a pitch of scanning lines to be irradiated, 8 and 9 designating a first scanning beam and a second scanning beam diffracted to positions which are spatially separated, respectively. 10 and 11 designating mirrors reflecting the scanning beams 8 and 9 in the direction of a reading window 12, 12 designating a reading window on which bar codes are disposed, 13 and 14 designating scanning lines produced by the scanning beams 8 and 9 respectively, 15 designating light scattered by bar codes of a label disposed on the reading window 12, 16 designating an optical detector, and 17 designating a motor for rotating the hologram disk 7.

Next, in operation, the light beam 2 irradiated from the laser oscillator 1 impinger upon the hologram lens 6 through the lens 3, the mirror 4 and the perforated mirror 5. Since the hologram disk 7 is rotated by the motor 17, the light beam 2 is deflected by the hologram lenses 6, 6 . . . installed on the hologram disk 7 in to scanning lines having number and directions equal to the hologram lenses 6, 6 . . . Of these beams the first scanning beam 8 and the second scanning beam 9 are representative. Since the center of each hologram lens 6 is moved, the scanning beams 8, 9 are shifted in a direction vertical to a tangent at a point O on the hologram disk 7. In other words, the scanning beams 8, 9 transmitted from the hologram lenses 6, 6 . . . are spatially separated from each other in the radial direction at suitable intervals by moving the centers of the hologram lenses 6, 6 . . . at regular intervals in turn. Thus, the mirrors 10, 11 for reflecting the scanning beams 8, 9 in the direction toward the reading window 12 are easy to install.

Next, the scanning beams 8, 9 are reflected by the mirrors 10, 11 which are installed at predetermined angles and positions, in the direction toward the reading window 12, whereby the scanning on the reading window by the scanning lines 13, 14 . . . is carried out.

Although, in FIG. 13 it is shown that two scanning beams were generated from one hologram lens 6, in fact, only one scanning line can be obtained from each hologram lens 6. In the foregoing description, the case where each hologram lens comes into the optical path of the light beam 2 by the rotation of the hologram disk 7, is expressed simply for explanation. In other words, the scanning beams equal in number to the hologram lenses 6, 6 . . . are diffracted in different upward directions from the hologram disk 7, and a plurality of mirrors equal in number to the scanning beams (and hologram lenses), or more in number, are arranged to reflect the scanning beams toward the reading window 12.

And, upon scanning of bar codes of the label by the scanning beams 8, 9 and the others, the scattered light 15 reflected in a scattered manner by the bar codes arrives at the perforated mirror 5 through a course reverse to that of the scanning beams, where it is reflected and condensed into the optical detector 16. The optical detector 16 detects the scattered light 15 and converts it into an electric signal, whereby optically reading bar codes is effected.

In order that such a hologram scanner can read bar codes oriented in any direction with in high accuracy, it is necessary to increase the number of scanning lines in a given reading time as far as possible. That is to say, it is necessary to generate a scanning pattern having many scanning lines in each of many directions.

However, the above described conventional stationary hologram scanner has problems in that mirrors equal or more in number to the directions of scanning lines necessary for the reading must be arranged between the hologram lenses and the reading window, and since these mirrors must reflect beams deflected by the hologram lenses and used for scanning each mirror, it is necessary to enlarge each mirror, thereby enlarging the total optical system: and the like. Accordingly, the conventional hologram scanner has been inevitably large-sized and an operator operating this hologram scanner has been forced to operate it while seated in an unnatural and unreasonable posture or standing, in the case where an operator takes a seat opposite to a customer with a hologram scanner placed between them, since the operator's legs (in particular his knees) are brought into collision with a casing of a hologram scanner.

In view of the above described circumstances, it is thought that a hologram scanner can be small-sized as a whole by adopting a construction, in which the several mirrors 10, 11 and others positioned between the hologram scanner 7 and the reading window 12 shown in FIG. 13 are not used, as in the conventional hologram scanner. In order to make such a construction possible, it is necessary only to make a plurality of light beams impinge upon all the positions of the hologram lenses 6, 6 . . . of the hologram disk 7 to generate a plurality of scanning beams instead of deflecting one light beam 2 in a plurality of directions by the hologram lenses 6, 6 . . . of the rotating hologram disk 7. And, since the scanning beams are irradiated from a periphery of the hologram disk 7, if the centers of the hologram lenses are positioned so that the scanning beams may be condensed at one point (for example the reading window), a plurality of mirrors 10, 11 and others disposed between the hologram disk 7 and the reading window 12 shown in FIG. 13 are not necessary.

However, in order to realize such a construction, apparatus for making light beams impinge upon a plurality of hologram lenses 6, 6 . . . installed at the predetermined positions on the hologram disk 7 are necessary. For example, a light beam-switching over apparatus shown in FIG. 14 has been proposed.

Referring to FIG. 14, reference numeral 52 designates an incident light beam, 50 designating a rotating mirror rotated by a motor 51, and 53 (53a, 53b and 53c) designating reflected light beams.

The actions of such a light beam-switching over apparatus are described below.

The light beam 52 incident upon the rotating mirror 50 is reflected. If the rotating mirror 50 is not inclined (as shown by a full line in FIG. 14), the reflected light beam 53 is in a direction of 53a in accordance with the law of reflection. If the rotating mirror 50 is inclined by $+\theta°$ (as shown by a broken line in FIG. 14), the reflected light beam 53 is in the direction of 53b. In addition, if the rotating mirror 50 is inclined by $-\theta°$ (as shown by an alternate long and short dash line in FIG. 14), the reflected light beam 53 is in the direction of 53c. Accordingly, the direction of the reflected light beam 53 can be switched over in a range from 53a to 53c by controlling the inclination of the rotating mirror 50 by $\pm\theta°$.

However, such a light beam-switching over apparatus has disadvantages in that the rotating mirror 50 cannot quickly change the inclination thereof as a control speed increases, whereby producing a time loss in the switch-over of the direction of a light beam: the reflected light is not stabilized due to the vibration of the reflecting surface: the rotating mirror 50, the motor 51 and the control apparatus thereof are remarkably expensive: and the like.

SUMMARY OF THE INVENTION

The present invention has been achieved in view of the above described circumstances.

It is a first object of the present invention to provide a stationary hologram scanner which can read bar codes without enlarging an optical system even though the bar codes are laid in any directions against a reading window.

It is a second object of the present invention to provide a stationary hologram scanner in which major parts of the optical system are housed in a portion closer to one side thereof, whereby a cross section of the other portion thereof is reduced as far as possible so that an operator can operate the scanner while taking a seat in a reasonable and natural posture.

It is a third object of the present invention to provide a stationary hologram scanner simple in construction and in operation, having high accuracy and fidelity by using a light beam-switching over apparatus capable of changing one light beam to a plurality of light beams.

The above and further objects and features of the invention will more fully be apparent from the following detailed description with reference to accompanying drawings.

DETAILED DESCRIPTION OF THE PREFERRED EMBODIMENTS

Figure 1:
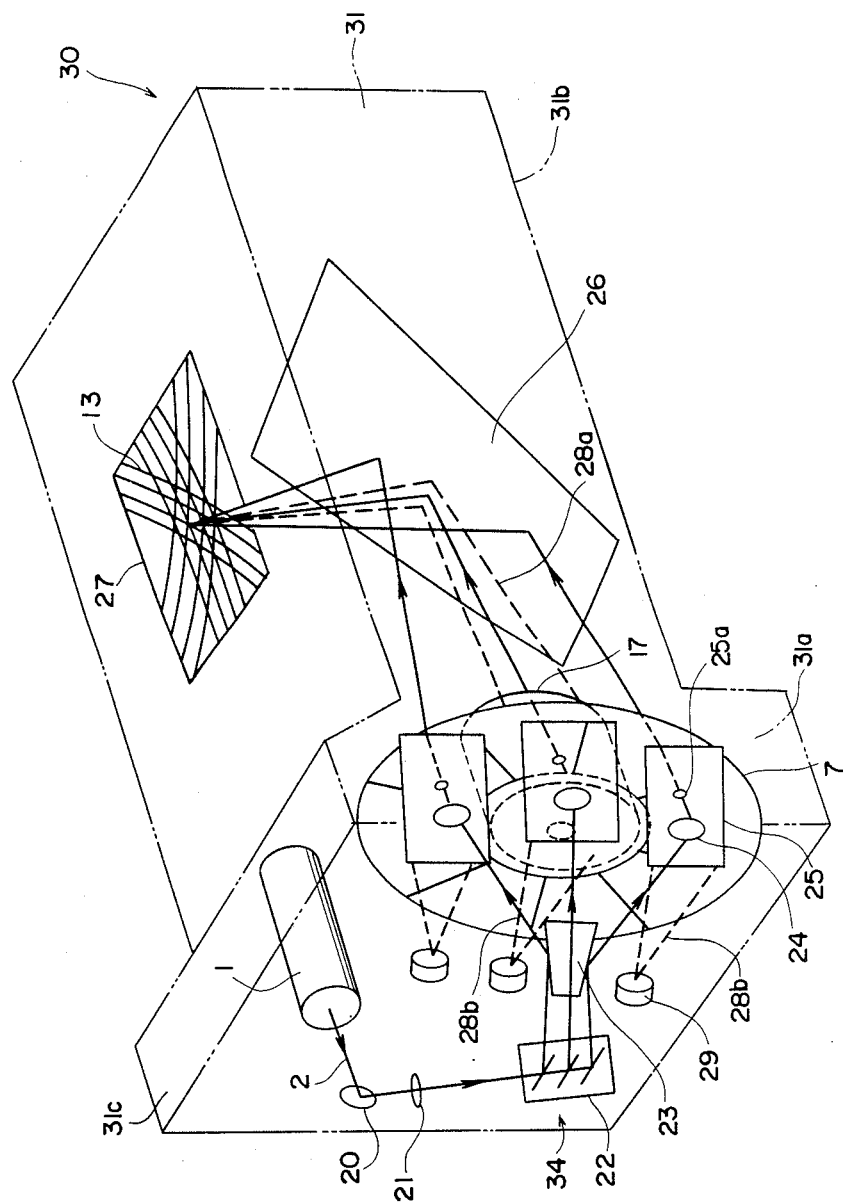
FIG. 1 is a schematic diagram showing a construction of a stationary hologram scanner according to the present invention.
Figure 2:
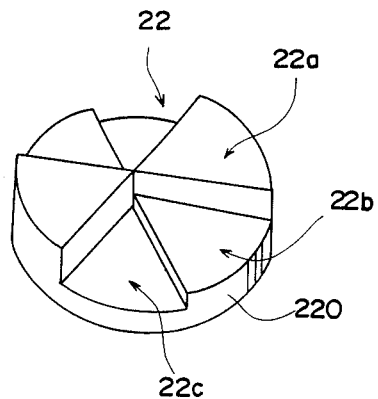
FIG. 2 is a schematic diagram showing a construction of a beam-splitter as a light beam-switching over apparatus of a stationary hologram scanner shown in FIG. 1.
Figure 3:
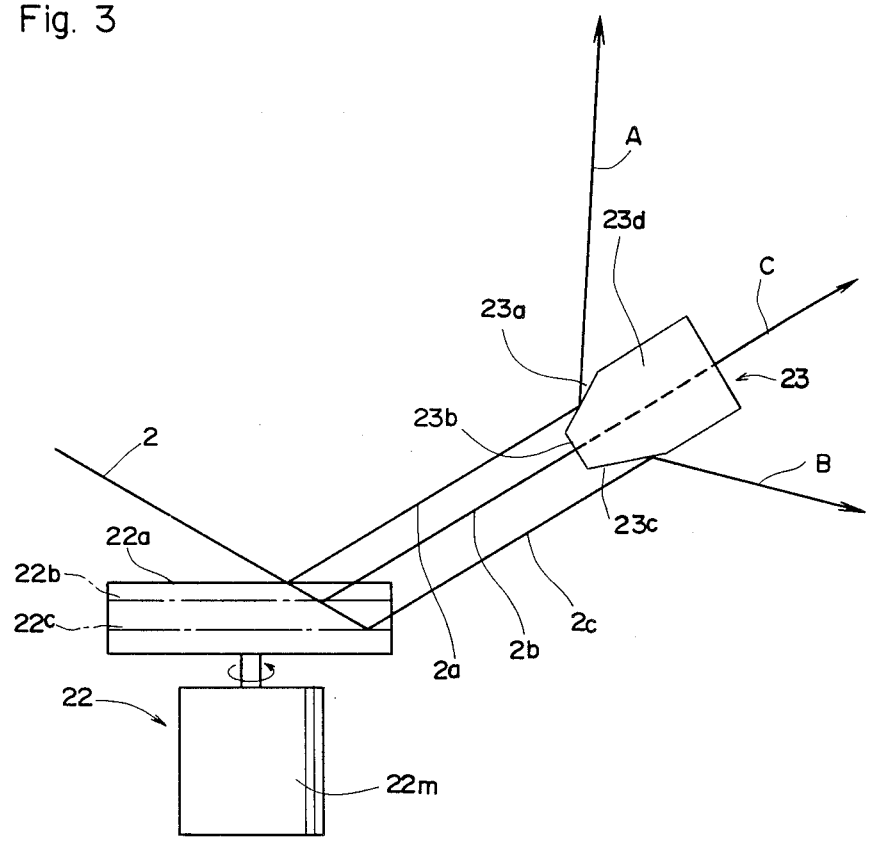
FIG. 3 is a schematic diagram showing a switching-over manner of a beam by the beam-splitter shown in FIG. 2.

The preferred embodiments of the present invention are described below with reference to accompanying drawings. Referring now to FIGS. 1 to 3 showing a stationary hologram scanner according to one embodiment of the present invention, reference numeral 1 designates a laser oscillator, 2 designating a light beam, 20 designating a mirror, 21 designating a lens, 22 designating a beam-splitter as a light beam-switching over apparatus for cutting and dividing the light beam 2 into three stages of an upper stage, a middle stage and a lower stage in a time division manner, 23 designating a prism mirror for reflecting or transmitting the light beam 2 cut and divided into three stages predetermined directions, 24, 24, 24 designating mirrors for reflecting the light beam coming from the prism mirror 23 in the directions toward openings of perforated mirrors 25, 25, 25, 7 designating a hologram disk whose rotational axis is arranged in parallel to a surface of a reading window 27 which will be described later, 17 designating a motor for rotating the hologram disk 7, 26 designating a mirror for reflecting light beams having passed through the openings of the perforated mirrors 25, 25, 25 in the direction toward the reading window 27, 27 designating a reading window above which bar codes of goods are disposed, 13 designating scanning lines projected on the reading window 27, 28a designating a part of scattered light reflected from bar codes (not shown), 28b designating scattered light collected by the hologram lenses on the hologram disk 7 (a plurality of hologram lenses are installed on the hologram disk 7 in the same manner as in the conventional one but not shown), and 29, 29, 29 designating a photoelectric conversion apparatus for receiving the scattered light 28b and converting it into electric signals.

Of the above described members, the members other than the reading window 27 are housed in a casing 31 and the reading window 27 is formed in the upper side surface of the casing 31 in the form of an opening. In addition, the members housed in the casing 31 are collected in a portion 31a closer to one side of the casing 31 having a cross section larger than that of a portion 31b of an operator's position 30 side.

In addition, in the above described construction the laser oscillator 1, the mirror 20, the lens 21, the beam-splitter 22, the prism mirror 23 and the mirror 24 compose a light beam impinging means 34 for making light beams, which are equal in number to scanning directions necessary for reading bar codes, impinge upon hologram lenses, arranged at the predetermined positions different from each other, of the hologram disk 7.

Referring to FIG. 2, which is a schematic diagram showing a construction of the beam splitter 22, and FIG. 3 which is a schematic diagram showing a switching over manner of a light beam by the beam-splitter shown in FIG. 2, reference numeral 220 designates a rotating mirror, 22m designating a motor for rotating the rotating mirror 220 at the predetermined speed, and 23 designating the above described prism mirror.

The rotating mirror 220 is adapted so that a surface thereof, which is a reflecting surface, may be divided into six equal parts of 60° and three sets of reflecting surfaces 22a, 22b, 22c consisting of two surfaces opposite to each other may be arranged vertically to the rotational axis at different heights in a longitudinal direction of the rotational axis.

Accordingly, when the light beam 2 impinges upon the reflecting surface of the rotating mirror 220, a reflecting position of the incided light beam is different (an optical path length of the light beam 2 is different) in dependence upon the reflecting surfaces 22a, 22b, 22c where the impinging light beam 2 is reflected, so that one impinging light beam 2 is switched over to three parallel beams 2a, 2b, 2c in a time division manner with a rotation of the rotating mirror 220.

Of above-mentioned three parallel beams 2a, 2b, 2c, the beams 2a, 2c of both sides impinge upon mirror surfaces 23a, 23c of both sides of the prism mirror 23, where they are reflected to proceed in the directions toward the perforated mirrors 25, 25 while the middle beam 2b impinges upon a front prism surface 23b of the prism mirror 23 and passes through the prism mirror 23 to proceed straight in the direction toward the perforated mirror 25.

Figure 4B:
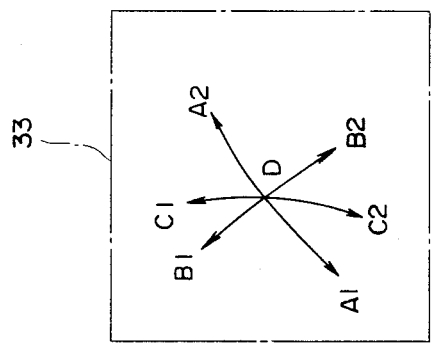
FIG. 4 is a schematic diagram showing a construction of an optical system of a stationary hologram scanner according to the present invention.
Figure 4A:
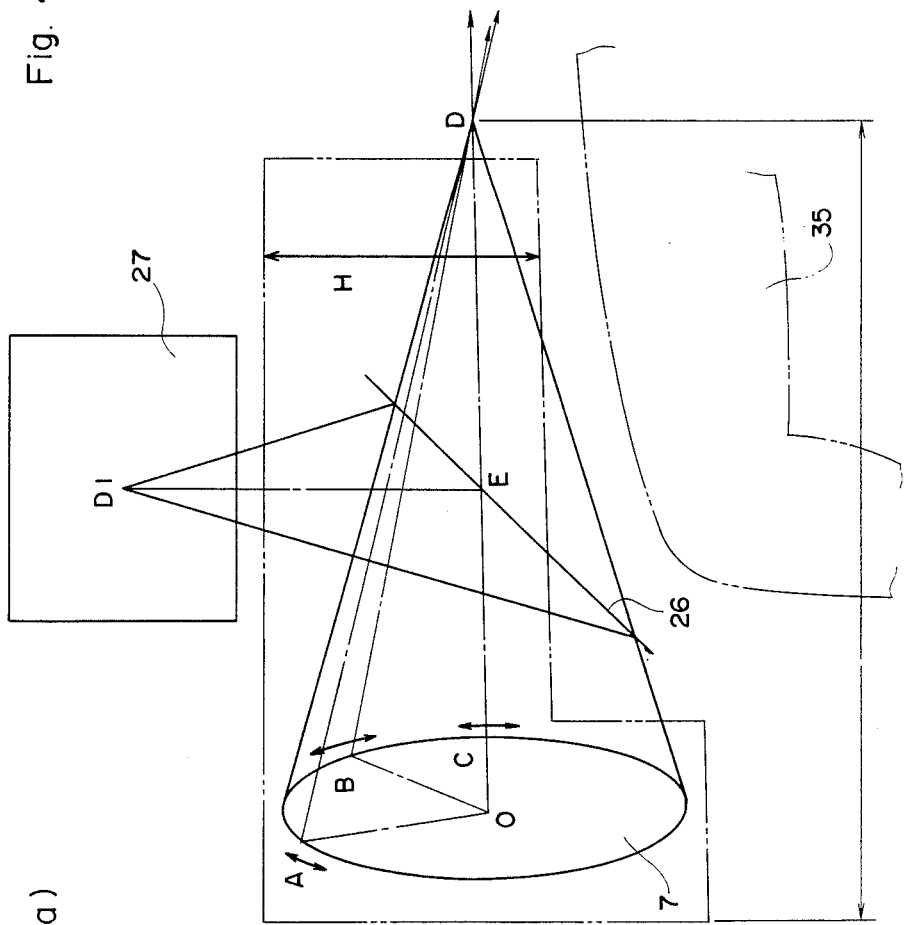

Next, a fundamental construction of an optical system is described below with reference to FIG. 4. Referring to FIG. 4(a), an optical system to the rear of the hologram disk 7 can be expressed by a cone with the hologram disk 7 as the base and a condensing position D of the hologram lenses 6, 6 . . . as a summit. Since the light beam 2 impinging upon three points A, B, C on the hologram disk 7 is deflected in a peripheral direction of the hologram disk 7, scanning lines are generated in the directions A1A2, B1B2, C1C2 with D as a center in a plane 33 parallel to the hologram disk 7 and including the condensing point D, as shown in FIG. 4(b). Since intersecting angles among these scanning lines are equal to <AOB and <BOC, they can be easily selected by changing the intersecting angles, i.e. the incident positions A, B, C.

Although one scanning line is shown in every one direction in FIG. 4(b), in order to generate a plurality of scanning lines in the same direction, it is necessary only to install the desired number of hologram lenses with the condensing point D being different in, for example, a radial direction of the hologram disk 7 (a direction shown by an arrow H in FIG. 4(a)) on the hologram disk 7 in the same manner as in the prior art.

Such an optical system is bent by 90° by means of the mirror 26 with a foot E of a perpendicular line drawn from a center D1 of the reading window 27 to a line OD connecting a center O of the hologram disk 7 with the condensing point D as a center. The scanning surfaces of light beams are formed on the reading window 27 by setting a distance from the point D1 on the reading window 27 to the point E so as to be equal to a distance from the point E to the point D. Thus, the number of the directions of scanning lines are equal to that of incident positions of the light beams 2a, 2b, 2c upon the hologram disk 7.

In operation, the light beam 2 irradiated from the laser oscillator 1 is bent by the mirror 20 to pass through the lens 21 and proceed toward the beam-splitter 22, where the light beam 2 is reflected by the mirror 22a, the mirror 22b or the mirror 22c in dependence upon the speed of beam-splitter 22 rotated by the motor 22m, whereby three parallel reflected beams 2a, 2b, 2c are obtained in a time division manner. These reflected beams impinge upon the mirror surface 23a, the prism surface 23b and the mirror surface 23c of the prism mirror 23 respectively. As a result, the light beams 2a and 2c are reflected by the mirror surfaces 23a and 23c to proceed in the directions shown by arrows A and B respectively while the light beam 2b passes through the prism mirror 23 to proceed in the direction shown by an arrow C. These light beams are reflected by the mirror 24 and impinge upon hologram lenses on the hologram disk 7 after passing through the openings 25a, 25a, 25a of the perforated mirrors 25, 25, 25 respectively. The light beam 2 diffracted by the hologram lenses is reflected by the mirror 26, condensed on the reading window 27 and reflected by bar codes passing over the reading window 27 to generate a scattered light 28. The scattered light beam 28a (properly speaking, scattered beams being equal to light beams diffracted by hologram lenses in number are generated along their optical axes but only one scattered light beam 28a is shown for simplification) in the drawing impinges upon the hologram lens through a course reverse to that of the light beam 2, is reflected by the perforated mirror 25 and then is condensed on the photoelectric conversion apparatus 29 to be converted into an electric signal.

Figure 5:
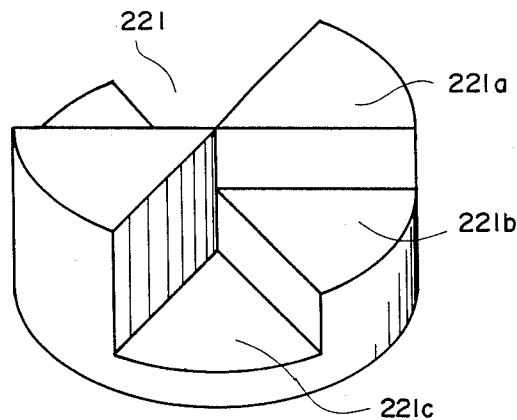
FIG. 5 is a schematic diagram showing a construction of a beam-splitter as a light beam-switching over apparatus according to the second embodiment of the present invention.
Figure 6:
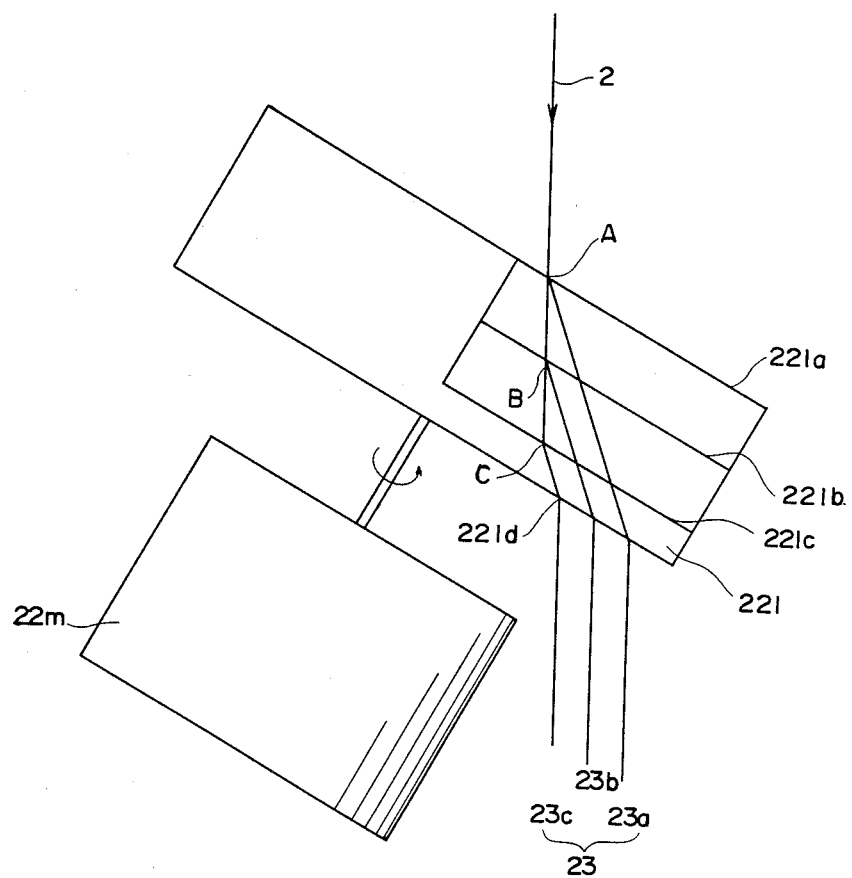
FIG. 6 is a schematic diagram showing a switching-over manner of a beam by the beam-splitter shown in FIG. 5, FIGS. 7 and 8 are schematic diagrams showing a construction of a beam-splitter as a light beam-switching over apparatus according to the third embodiment of the present invention.

FIG. 5 is a schematic diagram showing a beam-splitter 22 according to the second embodiment of the present invention. The beam-splitter 22 has the same construction as the beam-splitter shown in the above FIG. 2 excepting that it is formed of a light transmitting rotating member 221 made of light transmitting substances such as a prism. Accordingly, light transmitting surfaces 221a, 221b, 221c in this embodiment corresponding to the reflecting surfaces 22a, 22b, 22c in FIG. 2.

In the beam splitter 22 constructed in such a manner, the light beam 2 impinging upon the light transmitting surface 221a is refracted at a point A on the light transmitting surface 221a and then refracted again on the light transmitting surface 221d to become a beam 23a after passing through the light transmitting rotating member 221. Subsequently, the light beam 2 impinging upon the light transmitting surface 221b by rotating the light transmitting rotating member 221 by 60° is refracted at a point B on the light transmitting surface 221b and then refracted again on the light transmitting surface 221d to become a beam 23b after passing through the light transmitting rotating member 221. The light beam 2 impinging upon the light transmitting surface 221c by further rotating the light transmitting rotating member 221 is refracted at a point C on the light transmitting surface 221c and then refracted again on the light transmitting surface 221d to become a beam 23c after passing through the light transmitting rotating member 221. As described above, the impinging light beam can be switched over into three parallel light beams 23a, 23b, 23c to each other by rotating the light transmitting rotating member 221 by means of the motor 22m.

In addition, the light beams 23a, 23b, 23c are projected directly or indirectly after being reflected by a mirror and the like upon the prism mirror 23.

Figure 7:
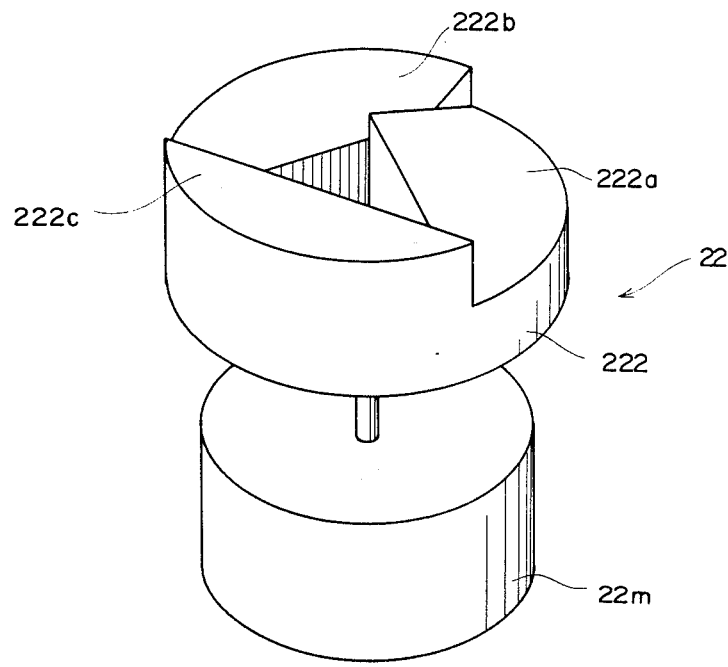
Figure 8:
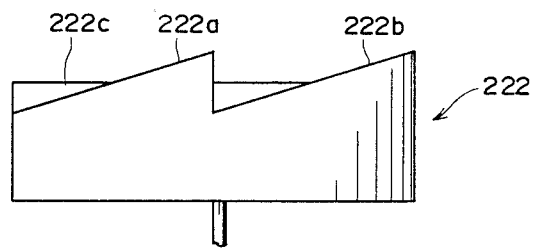
Figure 9:
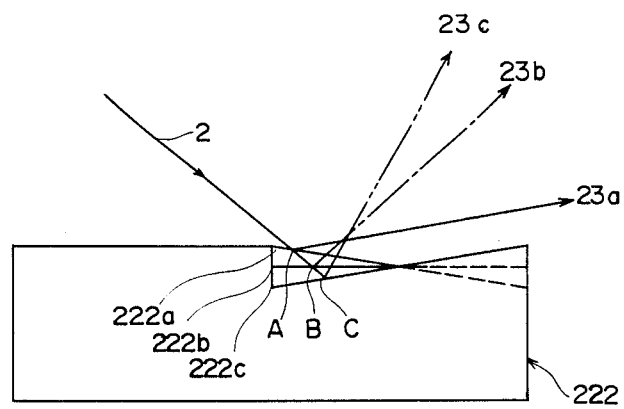
FIG. 9 is a schematic diagram showing a switching-over manner of a beam by the beam-splitter shown in FIGS. 7 and 8, FIGS. 10, 11 and 12 are schematic diagrams showing a construction of a beam-splitter as a light beam-switching over apparatus according to the fourth embodiment of the present invention.

Referring to FIG. 7, which is a schematic diagram showing a beam-splitter 22 according to the third embodiment of the present invention, FIG. 8, which is a side view showing a construction of a rotating mirror 222 of the beam-splitter 22 shown in FIG. 7, and FIG. 9, which is a schematic diagram showing an operation of the rotating mirror 222 shown in FIG. 8, reference numeral 2 designates an impinging light beam, 222 designating a rotating mirror provided with three reflecting surfaces 222a, 222b, 222c arranged so as to be radially divided with rotational axis thereof as a center, 3 designating a reflected light beam, and 22m designating a motor for rotating the rotating mirror 222 at the predetermined speed.

As shown in FIGS. 7, 8, the rotating mirror 222 is composed of three reflecting surfaces 222a, 222b, 222c different from each other in inclination obtained by being divided it into equal three parts and rotated by the motor 22m at the predetermined speed.

Referring particularly to FIG. 9, the light beam 2 impinging upon the reflecting surface 222a is reflected at a point A on the reflecting surface 222a in accordance with the law of reflection to beciome a reflected light beam 23a. Then, the light beam 2 impinges upon the reflecting surface 222b by rotating the rotating mirror 222 by 120°. At this time, the impinging light beam 2 is reflected at a point B on the reflecting surface 222b to become a reflected light beam 223b. The light beam 2 impinges upon the reflecting surface 222c by further rotating the rotating mirror 222 by 120°.

At this time, the impinging light beam 2 is reflected at a point C on the reflecting surface 222c to become a reflected light beam 223c. Thus, one light beam 2 can be switched-over to three reflected light beam 23a, 23b, 23c different from each other in direction by rotating the rotating mirror 223 by means of the motor 22m.

In addition, in the case where the rotating mirror 222 constructing the beam-splitter 22 is formed of a light transmitting prism and the like, the light beam 2 impinging upon the differently inclined surfaces 222a, 222b, 222c, respectively is also refracted by the surfaces 222a, 222b, 222c and a surface 222d, letting out the light beam 2 at the predetermined refractive indexes, so it can be switched-over to the beams 23a, 23b, 23c being different in direction.

Figure 10:
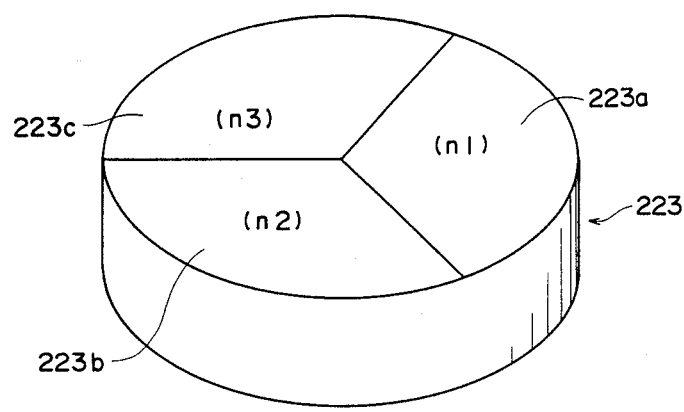
Figure 11:
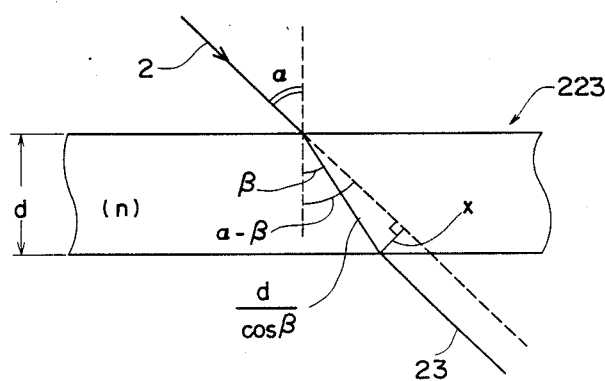
Figure 12:
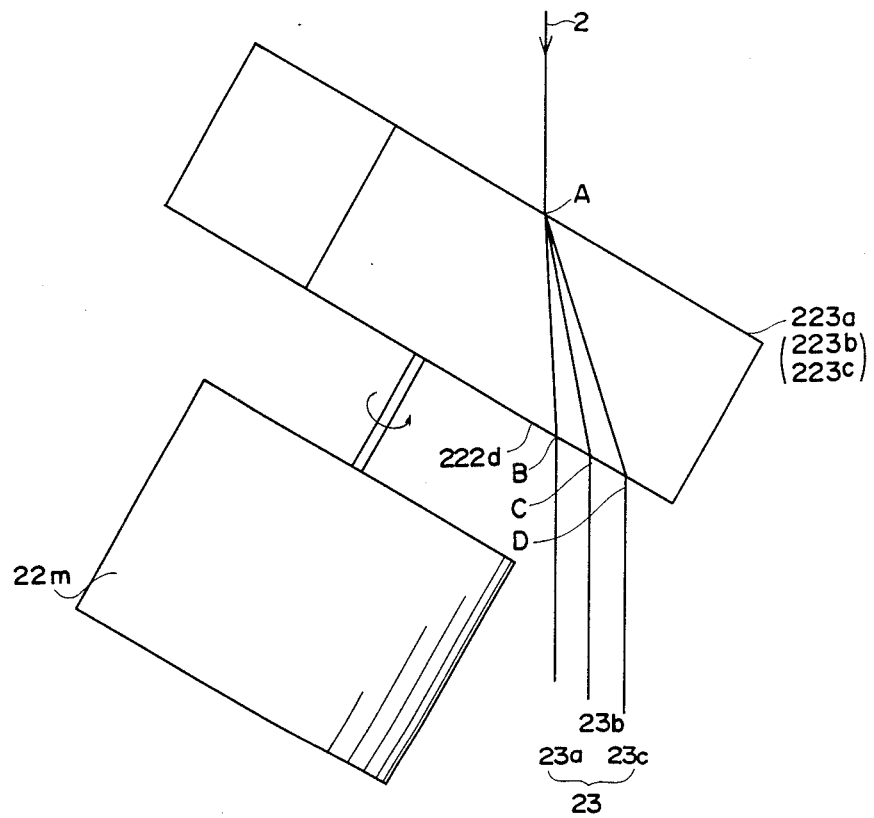
Figure 13:
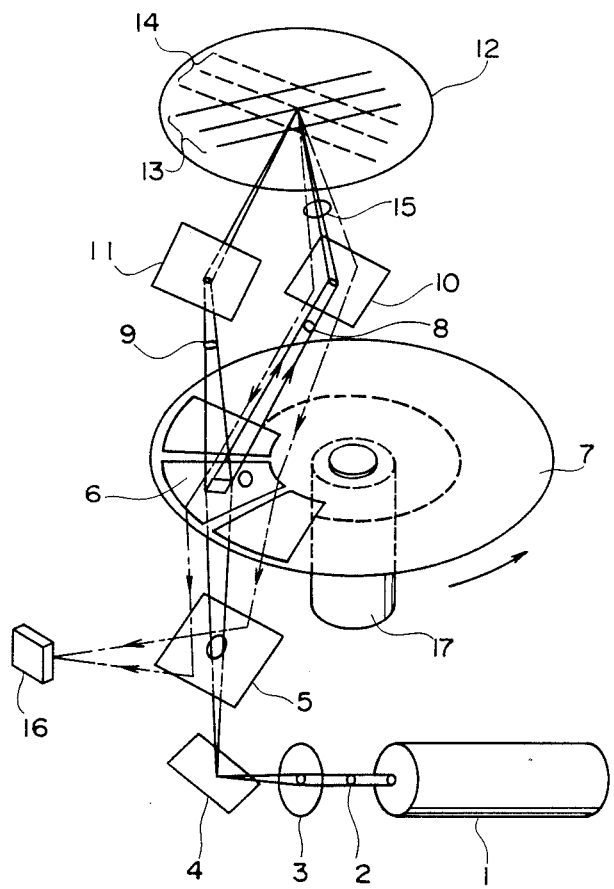
FIG. 13 is a schematic diagram showing a construction of the conventional stationary hologram scanner.
Figure 14:
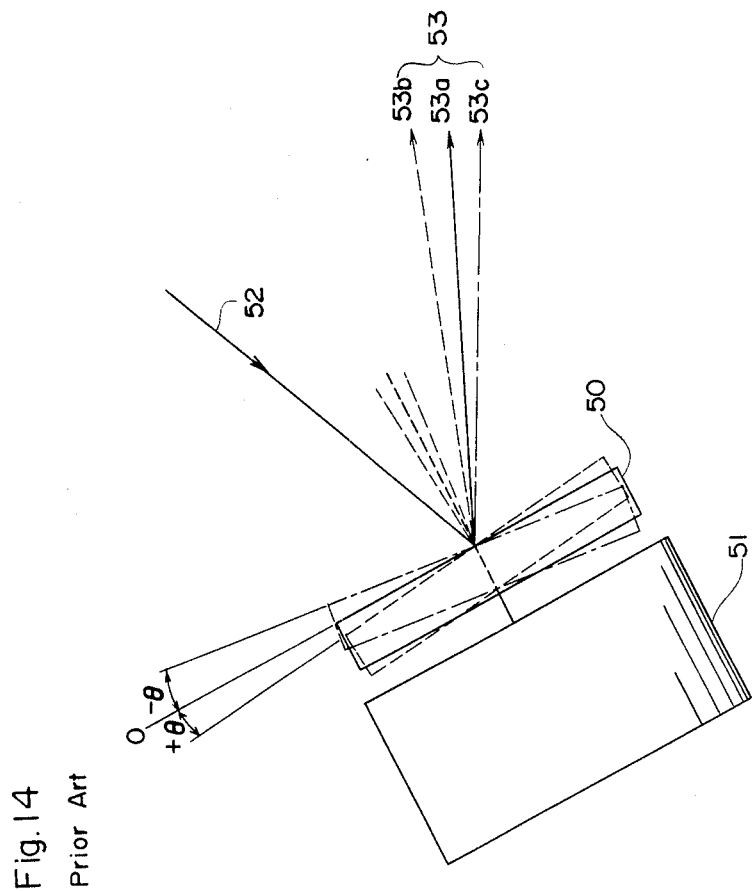
FIG. 14 is a schematic diagram showing a construction of the conventional beam-switching over apparatus and a switching-over manner of a beam by the conventional beam-switching over apparatus.

Referring to FIG. 10, which is a schematic diagram showing a construction of a light transmitting rotating member 223 used in a beam-splitter 22 according to the fourth embodiment of the present invention, and FIGS. 11, 12, which are schematic diagrams showing an operation of the light transmitting rotating member 223 shown in FIG. 10, reference numeral 2 designates an impinging light beam, 223 designating a light transmitting rotating member, 23 designating a transmitted light beam, and 22m designating a motor for rotationally driving the light transmitting rotating member 223 at the predetermined speed. As shown in FIG. 10, the light transmitting rotating member 223 comprises three light transmitting members 222a, 222b, 222c obtained by dividing it into three equal parts arranged in a radially divided manner around rotational axis thereof. In addition, the three light transmitting members 222a, 222b, 222c are different in refractive index. The refractive indices $n_1$, $n_2$, $n_3$ of the light transmitting members 222a, 222b, 222c, for example, are 1.5, 1.7 and 1.9 respectively.

Referring particularly to FIG. 11, the light beam 2 impinging upon the light transmitting surface 222a is refracted at a point A on the surface of the light transmitting member 222a with the refractive index being $n_1$ and then refracted again at a point B on the reverse surface of the light transmitting member 222a to become a beam 23a after passing through the light transmitting member 222a. Then, the light beam 2 impinging upon the light transmitting member 222b with refractive index $n_2$ by rotating the light transmitting rotating member 222 by 120° is refracted at a point A on the surface of the light transmitting member 222b and then refracted again at a point C on the reverse surface of the light transmitting member 222b to become a beam 23b after passing through the light transmitting member 222b. The light beam 2 impinging upon the light transmitting member 222c with the refractive index being $n_3$ by further rotating the light transmitting rotating member 222 by 120° is refracted at a point A on the surface of the light transmitting member 222c and then refracted again at a point D on the reverse surface of the light transmitting member 222c to become a beam 23c after passing through the light transmitting member 222c. Thus, the impinging light beam 2 can be switched-over to three light beams 23a, 23b, 23c by rotating the light transmitting rotating member 222 by means of the motor 22m.

FIG. 11 shows the relation between the displacement x of the light beam let out and the refractive index n, the incidence angle $\alpha$, the thickness of the light transmitting member d and the refractive angle $\beta$.

The principle of the refractive index is expressed by the equation:

$$\sin \alpha = n \cdot \sin \beta.$$

From this equation the following equation for expressing the beam displacement x is obtained:

$$\begin{aligned} x &= \frac{d}{\cos \beta} \cdot \sin(\alpha - \beta) \\ &= d(\sin \alpha - \cos \alpha \cdot \tan \beta) \\ &= d \cdot \sin \alpha \left( 1 - \frac{\cos \alpha}{\sqrt{n^2 - \sin^2 \alpha}} \right) \end{aligned}$$

And, from this equation the following differential equation is introduced:

$$\frac{dx}{dn} = \frac{n \cdot d \cdot \sin \alpha \cdot \cos \alpha}{(n^2 - \sin^2 \alpha)^3}$$

Accordingly, the beam displacement $\Delta x$ due to the refractive index difference $\Delta n$ is expressed by the following equation:

$$\Delta x = \frac{n \cdot d \cdot \sin \alpha \cdot \cos \alpha}{(\sqrt{n^2 - \sin^2 d})^3} \cdot \Delta n$$

Since optical glass has a wide range of refractive index from about 1.45 to about 1.95 in dependence upon the composition thereof, one impinging light beam 2 can be switched-over to three light beams 23a, 23b, 23c parallel to each other by suitably selecting and setting the thickness d of the light transmitting member, the refractive indexes $n_1$, $n_2$, $n_3$ of the light transmitting members 222a, 222b, 222c and the incidence angle $\alpha$ of the light beam.

Although in an apparatus according to the above described embodiment the light beam is adapted to divide into multiple directions before being impinging upon the hologram disk, whereby requiring a number of mirrors equal to the number of directions of the light beam in an optical system between the laser oscillator and the hologram disk, the mirrors may be small-sized as the light beam is not deflected. In addition, since the optical system between the laser oscillator and the hologram disk includes almost the major parts therein and only one mirror is necessary between the hologram disk and the reading window, the major parts of the optical system, i.e. the optical system between the laser oscillator and the hologram disk, can be collectively housed in a side opposite to a side where an operator is positioned and the simplified optical system between the hologram disk and the reading window having a large optical path length can be installed in an operator's side and as a result, the operator's side portion can be thin-walled and the operator can operate putting operator's knees in the space below the scanner (refer to 35 in FIG. 4) without changing the width and the length unlike the conventional scanner. An "operation in a seated posture" is possible.

Further, in an apparatus according to the present invention is is necessary only to install a large number of small-sized mirrors in the optical system in front of the hologram disk and one large-sized mirror in the optical system to the rear of the hologram disk, and as a result, the apparatus hardly becomes large-sized and the weight thereof hardly increases even in the case where the number of directions of scanning lines is increased in order to make the highly accurate reading of bar codes of every direction possible.

In addition, in an apparatus according to the present invention, the angle (direction) of scanning lines can be easily changed by changing the impinging position of the light beam upon the hologram disk.

Also, in an apparatus according to the present invention a time of switching-over the light beam to various directions can be easily changed by changing the shape and size of the reflecting surface or the light transmitting surface in a stepped portion of the beam splitter.

Although in the above described embodiment, an explanation has been given about a plurality of light beams impinging upon the hologram lenses disposed at different positions, the present invention can be similarly applied to the case where one light beam impinges upon the hologram lenses. Also in this case, if the major optical parts are arranged in the side opposite to the operator's, the scanner can be thinned. In addition, the portion having a larger cross section of the casing may be expanded in only any one direction toward the upper side surface, the lower side surface and both side surfaces of the casing. In addition, it is not always necessary to install the hologram disk so as to be strictly vertical with respect to the reading window.

Although scanning lines of three directions are described in the above described embodiments, the number of directions may be optionally selected. Although one mirror 26 is disposed between the hologram disk 7 and the reading window 27 in the above described embodiments, a plurality of mirrors can be used to obtain scanning lines in other directions on the scanning surface. However, the scanning direction in this case in one direction. Accordingly, it goes without saying that the use of a plurality of mirrors is within the scope of the present invention. Although the condensing light beam on the reading window is shown in FIG. 1, the light beam may be condensed at a point apart from the reading window to obtain the scanning lines.

In addition, the prism mirror 23 may be composed of mirrors combined. Further, although the photoelectric conversion apparatus 29 equal to impinging beams in number have been disclosed in the above described embodiment, any number and arrangement can be selected by the combination of mirrors and the like.

As this invention may be embodied in several forms without departing from the spirit of essential characteristics thereof, the present embodiment is therefore illustrative and not restrictive; the scope of the invention is defined by the appended claims rather than by the description preceding them, and all changes and equivalents that fall within the scope of the claims are therefore intended to be embraced by the claims.

What is claimed is:

1. A stationary hologram scanner comprising a hologram disk, in which a plurality of hologram lenses are arranged at predetermined peripheral positions on the hologram disk, the hologram lenses for deflecting a light beam impinging thereon and projecting said beam upon a bar code to be scanned; and light beam impinging means for making a number of light beams impinge upon the hologram disk, the number of light beams being equal to a number of scanning directions necessary for scanning the bar code, and the light beams impinging from different directions upon different ones of the plurality of hologram lenses.

2. A stationary hologram scanner as set forth in claim 1, wherein said light beam impinging means comprises a rotatable light transmitting member made of a light transmitting substance, and having a plurality of surfaces arranged in a radially divided manner around a rotational axis thereof, the surfaces being different from each other in height in the direction of said rotational axis, and being parallel to a light beam outgoing side of the member from which the number of light beams go out, and a motor for rotationally driving said rotatable member at a predetermined speed, wherein a light beam impinging upon said surfaces is divided into a plurality of parallel light beams due to differences in outgoing positions from said light beam outgoing side of said rotatable member by differences in optical path lengths when the light beam impinging upon said surfaces is transmitted by said rotatable member.

3. A stationary hologram scanner as set forth in claim 1, wherein said light beam impinging means comprises a rotating member having a plurality of reflecting surfaces arranged in a radially divided manner around a rotational axis thereof, the reflecting surfaces being parallel to each other, and being different from each other in height in the direction of said rotational axis, and a motor for rotationally driving said rotating member at a predetermined speed, wherein a light beam impinging upon said reflecting surfaces is divided into a plurality of parallel light beams by differences in optical path lengths to said reflecting surfaces of the light beam impinging upon said reflecting surfaces.

4. A stationary hologram scanner as set forth in claim 1, wherein said light beam impinging means comprises a light transmitting rotating member having a plurality of light transmitting members arranged in a radially divided manner, the light transmitting members having mutually different refractive indices, and a motor for rotationally driving said rotating member at a predetermined speed, wherein a light beam impinging upon said light transmitting members is divided into a plurality of parallel light beams by differences in refraction of the light beam impinging upon said light transmitting members.

5. A stationary hologram scanner as set forth in claim 1, wherein said light beam impinging means comprises a light transmitting rotating member being made of a light transmitting substance, the rotating member having a plurality of surfaces arranged in a radially divided manner around a rotational axis thereof, and the surfaces having mutually different inclined angles in a radial direction with respect to said rotational axis, and a motor for rotationally driving said rotating member at a predetermined speed, wherein a light beam impinging upon said surfaces is divided into a plurality of light beams having a plurality of outgoing directions by differences in refraction when the impinging light beam is transmitted by said rotating member.

6. A stationary hologram scanner as set forth in claim 1, wherein said light beam impinging means comprises a rotating member having a plurality of reflecting surfaces arranged in a radially divided manner around a rotational axis thereof and having mutually different inclined angles in a radial direction with respect to said rotational axis, and a motor for rotationally driving said rotating member at a predetermined speed, wherein a light beam impinging upon said reflecting surfaces is divided into a plurality of light beams having a plurality of directions by differences in reflection thereof.

7. A stationary hologram scanner provided with a hologram disk on which a plurality of hologram lenses are peripherally arranged at predetermined positions for deflecting a light beam and projecting it upon bar codes to be scanned, comprising light beam impinging means for making a number of light beams impinge upon the predetermined positions on said hologram disk, the number of light beams being equal to a number of scanning directions necessary for scanning the bar codes, and the light beams impinging from different directions upon different ones of the plurality of hologram lenses, and a casing for optic parts including said light beam impinging means, the casing being provided with a window for reading said bar codes therethrough, said casing having a larger sectional area at a first portion closer to a side opposite to an operation side than at a second portion at the operation side, and housing said optical parts in said larger sectional area.

8. A stationary hologram scanner as set forth in claim 7, wherein said optical parts include light beam impinging means for making at least one light beam impinge upon said hologram lenses, said hologram disk being arranged almost vertically with respect to said window for reading bar codes and a photoelectric conversion apparatus for converting scattered light reflected by said bar codes and collected by said hologram lenses into electric signals.

9. A stationary hologram scanner as set forth in claim 8, wherein said light beam impinging means comprises a light transmitting rotating member made of a light transmitting substance, and having a plurality of surfaces arranged in a radially divided manner around a rotational axis thereof, the surfaces being different from each other in height in the direction of said rotational axis, and being parallel to a light beam outgoing side from which the number of light beams go out, and a motor for rotationally driving said rotating member at a predetermined speed, wherein a light beam impinging upon said surfaces is divided into a plurality of parallel light beams due to differences in outgoing positions from said light beam outgoing side of said rotating member by differences in optical path lengths when the light beam impinging upon said surfaces is transmitted by said rotating member.

10. A stationary hologram scanner as set forth in claim 8, wherein said light beam impinging means comprises a rotating member having a plurality of reflecting surfaces arranged in a radially divided manner around a rotational axis thereof, the reflecting surfaces being parallel to each other, and being different from each other in height in the direction of said rotational axis, and a motor for rotationally driving said rotating member at a predetermined speed, wherein a light beam impinging upon said reflecting surfaces is divided into a plurality of parallel light beams by differences in optical path lengths to said reflecting surfaces of the light beam impinging upon said reflecting surfaces.

11. A stationary hologram scanner as set forth in claim 8, wherein said light beam impinging means comprises a light transmitting rotating member having a plurality of light transmitting members arranged in a radially divided manner, the light transmitting members having mutually different refractive indices, and a motor for rotationally driving said rotating member at a predetermined speed, wherein a light beam impinging upon said light transmitting members is divided into a plurality of parallel light beams by differences in refraction of the light beam impinging upon said light transmitting members.

12. A stationary hologram scanner as set forth in claim 8, wherein said light beam impinging means comprises
- a light transmitting rotating member being made of a light transmitting substance, the rotating member having a plurality of surfaces arranged in a radially divided manner around a rotational axis thereof, and the surfaces having mutually different inclined angles in a radial direction with respect to said rotational axis, and
- a motor for rotationally driving said rotating member at a predetermined speed,
- wherein a light beam impinging upon said surfaces is divided into a plurality of light beams having a plurality of outgoing directions by differences in refraction when the impinging light beam is transmitted by said rotating member.

13. A stationary hologram scanner as set forth in claim 8, wherein said light beam impinging means comprises
- a rotating member having a plurality of reflecting surfaces arranged in a radially divided manner around a rotational axis thereof and having mutually different inclined angles in a radial direction with respect to said rotational axis, and
- a motor for rotationally driving said rotating member at a predetermined speed,
- wherein a light beam impinging upon said reflecting surfaces is divided into a plurality of light beams having a plurality of directions by differences in reflection thereof.

14. A stationary hologram scanner as set forth in claim 7, wherein said optical parts include
- light beam impinging means for making at least one light beam impinge upon said hologram lenses,
- said hologram disk being arranged almost vertically with respect to said window for reading bar codes,
- a photoelectric conversion apparatus for converting scattered light reflected by said bar codes and collected by said hologram lenses into electric signals, and
- one reflecting mirror between said hologram disk and said window for reading bar codes.

15. A stationary hologram scanner as set forth in claim 14, wherein said light beam impinging means comprises
- a light transmitting rotating member made of a light transmitting substance, and having a plurality of surfaces arranged in a radially divided manner around a rotational axis thereof, the surfaces being different from each other in height in the direction of said rotational axis, and being parallel to a light beam outgoing side from which the number of light beams go out, and
- a motor for rotationally driving said rotating member at a predetermined speed,
- wherein a light beam impinging upon said surfaces is divided into a plurality of parallel light beams due to differences in outgoing positions from said light beam outgoing side of said rotating member by differences in optical path lengths when the light beam impinging upon said surfaces is transmitted by said rotating member.

16. A stationary hologram scanner as set forth in claim 14, wherein said light beam impinging means comprises
- a rotating member having a plurality of reflecting surfaces arranged in a radially divided manner around a rotational axis thereof, the reflecting surfaces being parallel to each other, and being different from each other in height in the direction of said rotational axis, and
- a motor for rotationally driving said rotating member at a predetermined speed,
- wherein a light beam impinging upon said reflecting surfaces is divided into a plurality of parallel light beams by difference in optical path lengths in said reflecting surfaces of the light beam impinging upon said reflecting surfaces.

17. A stationary hologram scanner as set forth in claim 14, wherein said light beam impinging means comprises
- a light transmitting rotating member having a plurality of light transmitting members arranged in a radially divided manner, the light transmitting members having mutually different refractive indices, and
- a motor for rotationally driving said rotating member at a predetermined speed,
- wherein a light beam impinging upon said light transmitting members is divided into a plurality of parallel light beams by differences in refraction of the light beam impinging upon said light transmitting members.

18. A stationary hologram scanner as set forth in claim 14, wherein said light beam impinging means comprises
- a light transmitting rotating member made of a light transmitting substance, the rotating member having a plurality of surfaces arranged in a radially divided manner around a rotational axis thereof, and the surfaces having mutually different inclined angles in a radial direction with respect to said rotational axis, and
- a motor for rotationally driving said rotating member at a predetermined speed,
- wherein a light beam impinging upon said surfaces is divided into a plurality of light beams having a plurality of outgoing directions by differences in refraction when the impinging light beam is transmitted by said rotating member.

19. A stationary hologram scanner as set forth in claim 14, wherein said light beam impinging means comprises
- a rotating member having a plurality of reflecting surfaces arranged in a radially divided manner around a rotational axis thereof and having mutually different inclined angles in a radial direction with respect to said rotational axis, and
- a motor for rotationally driving said rotating member at a predetermined speed,
- wherein a light beam impinging upon said reflecting surfaces is divided into a plurality of light beams having a plurality of directions by differences in reflection thereof.

* * * * *